Sept. 7, 1954 R. SCHNEGG 2,688,640
MANUFACTURE OF DIKETENE
Filed March 27, 1951
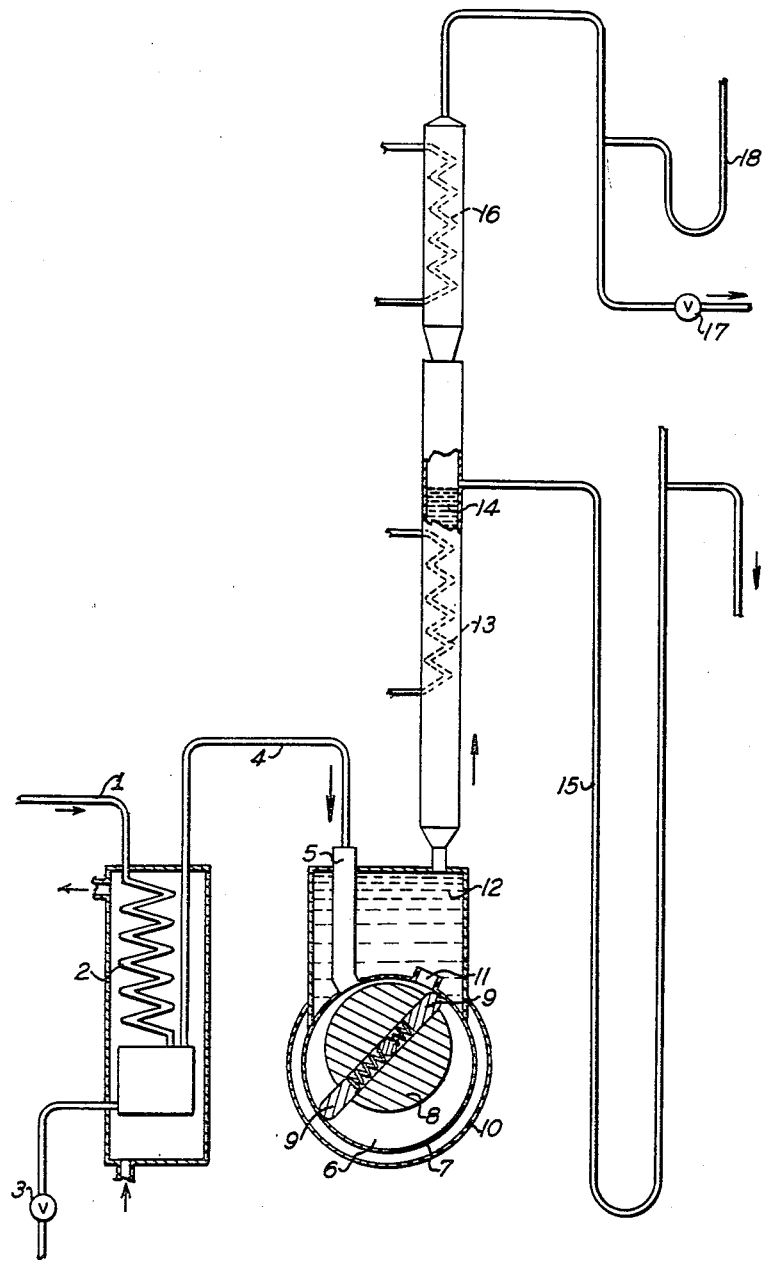
INVENTOR
ROBERT SCHNEGG
BY Burgess & Dinklage
ATTORNEY Patented Sept. 7, 1954

2,688,640

UNITED STATES PATENT OFFICE 2,688,640

MANUFACTURE OF DIKETENE

Robert Schnegg, Dormagen, Germany, assignor to Farbenfabriken Bayer Aktiengesellschaft, Leverkusen, Germany Application March 27, 1951, Serial No. 217,698

3 Claims. (Cl. 260—585.5)

The present invention relates to improvements in the manufacture of diketene, more particularly it relates to improvements in the polymerization of ketene to diketene.

In accordance with prior art processes diketene is prepared by polymerization of ketene in acetone at −50° C. and subsequently fractionally distilling acetone and the diketene formed, or by introducing ketene under slight pressure into diketene whereby ketene is polymerized to diketene. In the other processes the ketene which is, e. g., produced by pyrolysis of acetone or acetic acid in vacuo, has to be liquefied by strongly cooling at temperatures of about −60 to −70° C., whereupon the ketene is vaporized into the polymerization vessel. These processes, especially in view of the high differences in the temperatures to be applied, necessitate complicated and costly devices.

In accordance with the present invention diketene is prepared by polymerization of ketene in a very simple manner and with good yields by introducing gaseous ketene into a gas pump of the type operating with a movable member, the movable member being in contact with diketene. Gas pumps coming into consideration for the purpose of the invention are, e. g., piston or plunger pumps, rotary pumps, rotary cylinder pumps. In these pumps the diketene acts as lubricant and sealing liquid, respectively.

For processing according to the invention the ketene gas which, e. g., is prepared by pyrolysis of acetic acid in vacuo, is cooled to about −10° C. to −20° C. whereby it is freed from impurities, such as water and acetic acid. It is then introduced into the gas pump containing diketene. The ketene dissolves in the diketene and polymerizes to the largest part to diketene. The diketene formed is removed from the pump. For completing the polymerization a column may be installed at the pressure side of the pump, which column is fed with diketene and delivers the diketene formed by an overflow to a storage tank. By cooling, e. g., by means of running water, the pump is cooled to a temperature of about 10–70° C., preferably to 30 to 50° C. It is advantageous to work at a pressure up to about 2 atmospheres at the pressure side of the pump, although in most cases a pressure of about 100–400 mm. Hg will suffice. The process may, however, also be performed without applying pressure.

In the accompanying drawing the invention is illustrated by way of example.

The ketene gas which is liberated from the main quantity of water enters via pipe 1 the cooler 2 which is cooled with brine to −10° C. to −20° C. The condensate can be removed by means of valve 3 from below. The ketene gas is sucked through pipe 4 and pressure tube joint 5 into chamber 6 of casing 7 of a gas pump, said chamber 6 containing diketene as sealing liquid. Cylinder 8 with a slide 9 is eccentrically positioned in the gas pump and rotates in the direction of the arrow.

The polymerization of ketene gas to diketene substantially takes place in chamber 6. For maintaining the temperature of diketene in the pump at 25–30° C. the casing 7 is surrounded by a cooling jacket 10. The diketene is passed through pipe 11 into a collecting tank 12 and from there arrives at column 14 provided with a cooler 13 from which it is continuously removed via the syphon 15. Evaporated diketene, if any, is condensed in cooler 16. The residual gas leaves the cooler 16 and is throttled by means of the throttle valve 17 to a desired degree, the pressure exerted on the pressure side of the pump is indicated by a manometer 18.

The residual gas escaping through throttle valve 17 mainly consists of carbon monoxide, carbon dioxide, ethylene and small quantities of non-reacted ketene. The non-reacted ketene may be used in other reactions, e. g., for producing acetic anhydride. It is, however, possible to convert these residual quantities of ketene into diketene in a second analogous apparatus.

When operating with an appropriate arrangement it is not necessary to recover the non-reacted ketene from the residual gases since diketene is obtained according to the invention in yields of more than 90% of the theoretical.

Example

A rotating high vacuum gas pump with a suction capacity of 30 m.$^3$ per hour is charged with diketene, and ketene gas is sucked in under a pressure of 15 mm. Hg. With an arrangement of the apparatus as indicated in the drawing 1.5 to 2 kg. of diketene are discharged hourly. More than 90% of the ketene gas sucked in is converted into diketene if the temperature of the diketene in the pump is kept at 25–30° C. and the pressure in front of the throttle valve amounts to about 200 mm. Hg.

I claim:

1. Method for the continuous production of diketene, which comprises maintaining a variable volume reaction zone substantially filled with liquid diketene, and in substantially continuous operation; increasing the volume of said zone while passing gaseous ketene therein, decreasing the volume of said zone to compress the ketene therein to a pressure not in excess of about two atmospheres while maintaining a temperature of between about 10 and 70 degrees centigrade, removing an amount of diketene from the zone substantially equivalent to the amount of gaseous ketene introduced, and repeating the operation.

2. Method according to claim 1 in which the gaseous ketene is passed into said zone by sucking the gaseous ketene into the zone at subatmospheric pressure.

3. Method according to claim 2 in which the temperature is maintained between 25 and 30 degrees C.

References Cited in the file of this patent

UNITED STATES PATENTS

| Number | Name | Date |
| --- | --- | --- |
| 1,675,686 | Barnes | July 3, 1928 |
| 2,019,983 | Law | Nov. 5, 1935 |
| 2,216,450 | Mugdan et al. | Oct. 1, 1940 |

OTHER REFERENCES

Ser. No. 404,666, Popp et al. (A. P. C.), published July 30, 1941.